(12) United States Patent
Nitta

(10) Patent No.: US 8,884,636 B2
(45) Date of Patent: Nov. 11, 2014

(54) SENSOR

(75) Inventor: Mikio Nitta, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 181 days.

(21) Appl. No.: 13/521,536

(22) PCT Filed: Jun. 13, 2011

(86) PCT No.: PCT/JP2011/063526
§ 371 (c)(1),
(2), (4) Date: Jul. 11, 2012

(87) PCT Pub. No.: WO2011/158802
PCT Pub. Date: Dec. 22, 2011

(65) Prior Publication Data
US 2012/0293194 A1 Nov. 22, 2012

(30) Foreign Application Priority Data

Jun. 14, 2010 (JP) .................. 2010-135208

(51) Int. Cl.
| | | |
|---|---|---|
| G01R 27/08 | (2006.01) | |
| G01B 7/00 | (2006.01) | |
| G01D 11/24 | (2006.01) | |
| H01C 10/30 | (2006.01) | |
| G01D 5/165 | (2006.01) | |

(52) U.S. Cl.
CPC .............. *G01B 7/003* (2013.01); *G01D 11/245* (2013.01); *H01C 10/30* (2013.01); *G01D 5/165* (2013.01)
USPC ........... 324/705; 324/662; 324/661; 324/644; 324/635; 324/699; 324/716; 324/220; 73/1.79; 73/54.14; 73/54.33; 73/54.37; 702/94; 702/97; 702/149; 702/150; 702/151

(58) Field of Classification Search
CPC ..... G01B 7/003; G01D 5/165; G01D 11/245; H01C 10/30
USPC ......... 324/705, 662, 661, 644, 635, 699, 716, 324/220; 338/183; 73/1.79, 54.14, 54.33, 73/54.37, 854, 302; 702/94, 97, 149, 150, 702/151, 158
See application file for complete search history.

(56) References Cited

U.S. PATENT DOCUMENTS 2,922,977 A * 1/1960 Gottschall ...................... 338/183
5,039,975 A * 8/1991 Ishihara ......................... 338/312
(Continued)

FOREIGN PATENT DOCUMENTS

| EP | 1311052 A2 | 5/2003 |
|---|---|---|
| JP | S56-57161 A | 5/1981 |

(Continued)

OTHER PUBLICATIONS

International Preliminary Report on Patentability dated Jan. 24, 2013.

(Continued)

*Primary Examiner* — Huy Q Phan
*Assistant Examiner* — David Frederiksen
(74) *Attorney, Agent, or Firm* — Harness, Dickey & Pierce, PLC

(57) ABSTRACT

Disclosed is a sensor that can accurately detect displacement and prevents the phenomenon of a contact section between a shaft member and a sliding element receiver being shifted. The sensor comprising: a case having a through hole; a resistance substrate fixed at an inside of said case; a shaft member having a first end portion which is one end of the shaft member placed within said case and a second end portion which is other end of the shaft member exposed to an outside of said case from said through hole, said shaft member being placed at said through hole in a movable manner in an axial direction; and a sliding element receiver having a bearing end contacting with said second end portion of said shaft member, and attached with a brush sliding together with said resistance substrate, said sliding element receiver being capable of moving relatively against said resistance substrate with said shaft member. A hemispherical end face is formed at said first end portion. A hemispherical hole internally contacting with said hemispherical end face is formed at said bearing end.

2 Claims, 3 Drawing Sheets

(56) References Cited

U.S. PATENT DOCUMENTS

| | | | |
|---|---|---|---|
| 5,072,206 A * | 12/1991 | Kozuka et al. | 338/184 |
| 5,095,299 A | 3/1992 | Wakamatsu | |
| 5,345,215 A * | 9/1994 | Okumura et al. | 338/176 |
| 5,460,035 A * | 10/1995 | Pfaffenberger | 73/114.36 |
| 5,917,402 A * | 6/1999 | Ebata | 338/160 |
| 6,553,330 B2 * | 4/2003 | Ikeda et al. | 702/150 |
| 6,731,194 B1 * | 5/2004 | Abe | 338/167 |
| 6,768,321 B2 * | 7/2004 | Wain et al. | 324/699 |
| 7,484,417 B2 * | 2/2009 | Tohyama et al. | 73/753 |
| 2003/0183788 A1 * | 10/2003 | Pastyr et al. | 250/505.1 |

FOREIGN PATENT DOCUMENTS

| | | |
|---|---|---|
| JP | S61-133606 A | 6/1986 |
| JP | S63-180457 A | 11/1988 |
| JP | HO5-215507 A | 7/1993 |
| JP | 11023210 A * | 1/1999 |

OTHER PUBLICATIONS

From EP counterpart application, Extended European Search Report dated Jul. 7, 2014.

* cited by examiner

SENSOR

CROSS-REFERENCE TO RELATED APPLICATIONS

This application is a 371 U.S. National Stage of International Application No. PCT/JP2011/063526, filed on Jun. 13, 2011, and claims priority to Japanese Patent Application No. 2010-135208, filed on Jun. 14, 2010, the disclosures of which are herein incorporated by reference in their entirety.

TECHNICAL FIELD

The present invention relates to a sensor converting a mechanical displacement into an electronic signal which is called a stroke sensor or potentiometer.

BACKGROUND ART

In the sensor such as the stroke sensor detecting the mechanical displacement, a shaft member transmitting the displacement of the measuring object is in contact with a sliding element receiver attached with a sliding element at inside of a case. As for the shape of the contact section of the shaft member and the sliding element receiver, for example those having a flat end face of the shaft member and the end face of the sliding member, or those having hemispherical end face of the shaft member and flat end face of the sliding element supporting member are proposed.

PRIOR ART DOCUMENT

Patent document 1: Japanese Patent Application Laid Open H05-215507
Patent document 2: Japanese Patent Application Laid Open S61-133606

DISCLOSURE OF THE INVENTION

Technical Problems to be Solved by the Invention

However, in the sensor according to the conventional technology, in case the shaft member is tilted due to the shaking of the shaft member when it presses the sliding element receiver, there was a problem occurred such that the contact section between the shaft member and the sliding element receiver were shifted. For example, in the conventional technology having flat end face of the shaft member and the sliding element, when the shaft member is tilted, the end face abrasion occurs since the corner of the end face of one side and the flat plane of the other side slides against each other by contacting.

Also, in the conventional technology having a hemispherical end face of the shaft member and the flat end face of the sliding element receiver, by the tilting of the shaft member due to the shaking thereof, the end face of the shaft member easily moves on the end face of the sliding element receiver, and thus there was a problem that the end face was abraded. Thereby, in the sensor according to the conventional technology, the shifting of the contact section or the declined detection accuracy due to the abrasion occurs which has become a problem. Also, the sensor according to the conventional technology has a problem that along with the progression of the above mentioned abrasion, the hysteresis of the detection output becomes large which is observed between when the shaft member presses the sliding element receiver and when shaft member is pressed back by the sliding element receiver.

The present invention was accomplished in response to such problems, and the object is to prevent the shifting of the contact section of the shaft member and the sliding element receiver, and to provide a sensor capable of accurately detecting the displacement.

Means for Solving the Technical Problems

In order to solve the above object, a sensor according to the present invention comprises,
a case having a through hole,
a resistance substrate fixed at an inside of said case,
a shaft member wherein a first end portion which is an one side of end portion is placed at the inside of said case, a second end portion which is an other side of the end portion is exposed to an outside of said case from said through hole and said shaft member is placed at said through hole in a movable manner in an axial direction,
a sliding element receiver having an bearing end contacting with said second end portion of said shaft member, and attached with a brush sliding together with said resistance substrate, and moves relatively against said resistance substrate together with said shaft member; and
a hemispherical end face is formed at said first end portion, and
a hemispherical hole internally contacting with said hemispherical end face is formed at said bearing end.

The sensor according to the present invention has the hemispherical end face formed at the end portion of the shaft member, and the hemispherical hole internally contact with said hemispherical end face is formed at the bearing end. Therefore, even when the force which tilts the shaft member is applied, the radial direction move of the first end portion of the shaft member side is controlled by the hemispherical hole, thus the sensor according to the present invention can prevent the shifting of the contact section between the shaft member and the sliding element receiver. Thereby, the sensor according to the present invention can effectively prevent the deterioration of the detection accuracy caused by the shifting or the abrasion at the contact section of the shaft member and the sliding element receiver.

Also, the sensor according to the present invention can suppress the tilting of the shaft member even when the force to tilt the shaft member acts, since the force trying to match the position of the tip of the hemispherical end face and the bottom portion of the hemispherical hole also acts on the shaft member. Also, in the sensor according to the present invention, even when the force to tilt the shaft member acts, the change of the contact position of the hemispherical end face and the hemispherical hole is small and the hysteresis of the detection output can made small compared to the case when the force to tilt the shaft member is not acting.

Also, for example, the opening diameter of said hemispherical hole may be larger than the diameter of said first end portion. Thereby, the side face of the first end portion is prevented from contacting the bearing end, thus such shaft member can move further smoothly in the through hole.

Also, for example, a curvature R of said hemispherical hole may satisfy $R > 1/D_A$, when $D_A$ is a distance between the bottom portion of said hemispherical hole in a status that said shaft member is most exposed to the outside of said case and the center position of said through hole. Such sensor can further effectively use the force to suppress the tilting of the shaft member to the shaft member.

MODES FOR CARRYING OUT THE INVENTION

Figure 1:
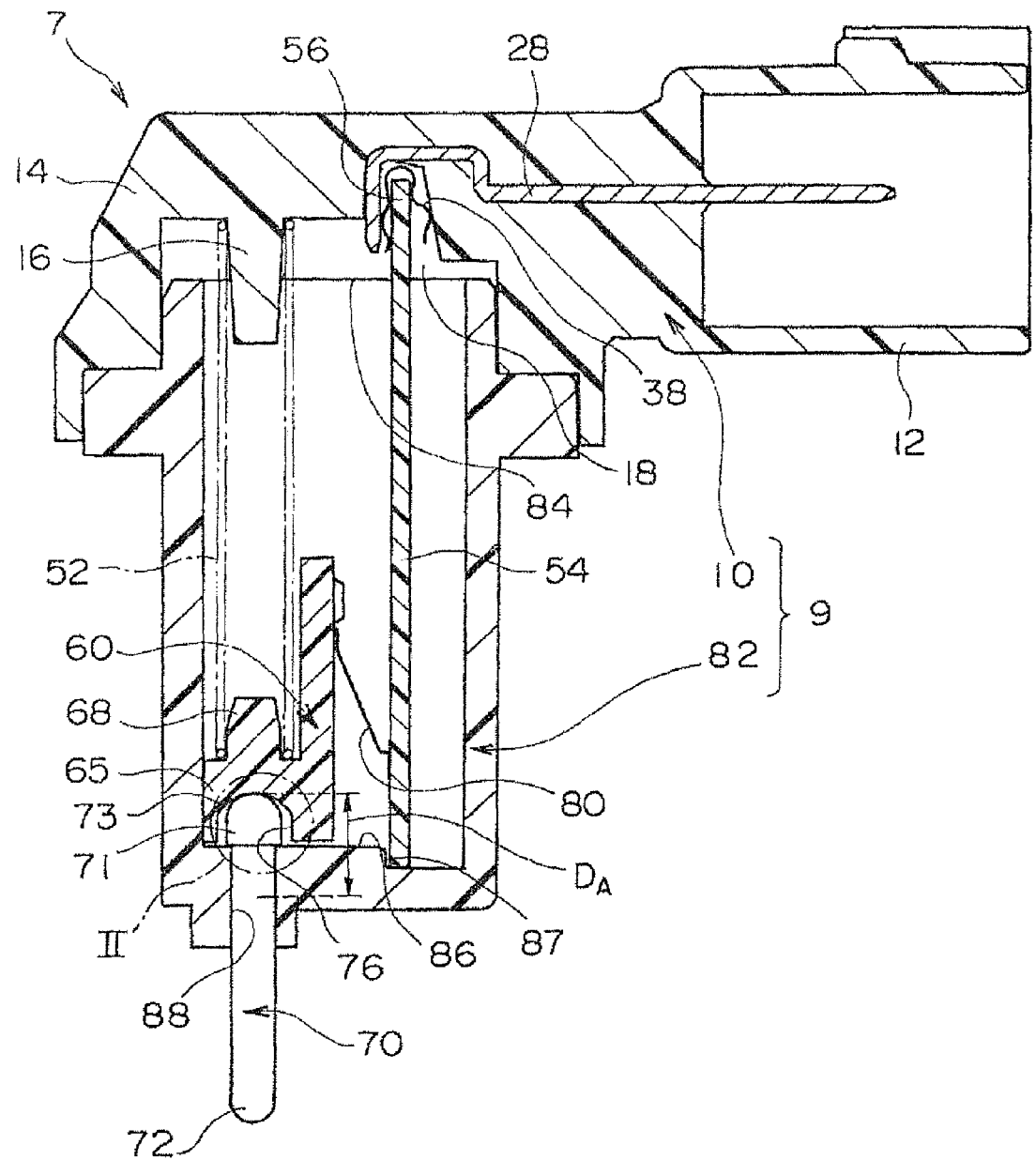
FIG. 1 is a cross section of the sensor according to an embodiment of the present invention.

FIG. 1 is a cross sectional figure of the sensor 7 according to one embodiment of the present invention. The sensor 7 converts the mechanical displacement transmitted from the shaft member 70 to the electronic signal such as the change in the voltage value or so, which is called stroke sensor or potentiometer or so.

When using the sensor 7, the measurement object of which the displacement is to be detected by the sensor 7 is in contact at the second end portion 72 of the shaft member 70. The displacement of the measurement object transmitted to the sliding element receiver 60 of which the first end portion 71 of the shaft member 70 is in contact, then it is converted into the change of the voltage value by the resistance substrate 54 and the brush 80 attached to the sliding element receiver 60. Also, at the connector portion 12, external terminals of other machines which uses the output of the sensor 7 are connected. Therefore, the displacement of the shaft member 70 is converted into the change of the voltage value by the brush 80 and the resistance substrate 54, and is transmitted to other machines using the output of the sensor 7 via the connector terminal 28.

As shown in FIG. 1, the sensor 7 comprises a case 9 which houses each member constituting the sensor 7, the resistance substrate 54, the shaft member 70, and the sliding element receiver 60. Also, the sensor 7 further comprises returning spring 52, the brush 80 and the clip 38 or so.

The case 9 is constituted by assembling a case main body 82 in which the sliding element receiver 60 or so are housed and a connector member 10 constituted by the connector terminal 28 and a resin mold which covers the connector terminal 28. The case main body 82 and the connector member 10 are produced by resin or so, however it is not particularly limited. Also, the case main body 82 and the connector member 10 are joined by adhesion or so however the joining method is not particularly limited.

The connector member 10 comprises the connector terminal 28, the top portion 14 functioning as the top for covering the case main body opening 84 of the case main body 82, and the connector portion 12 functioning as the connector to which the external terminal is connected.

The case main body 82 has an outer shape of rough tubular shape, and the case main body bottom portion 86 is formed at one side of the end portion, further the case main body opening 84 is formed at the other side of the end portion. Note that, the shape of the case main body 82 is not limited to tubular shape, and it may be polygonal column shape or other shapes or so.

In the inside of the case 9, the resistance substrate 54 is fixed. The resistance substrate 54 has an shape of a rectangular plate shape. One side of the end portion of the resistance substrate 54 is engaged to the step portion 87 formed at the case main body bottom portion 86, and the other side of the end portion of the resistance substrate 54, which is the substrate end portion 56, protrude out from the case main body opening 84.

The clip 38 is engaged at the substrate end portion 56, and the substrate end portion 56 and the clip 38 is housed and fixed in the housing groove 18 formed at the top portion 14. The resistance substrate 54 is electrically connected to the connector terminal 28 via the clip 38. The clip 38 resiliently contacts to the connector terminal 28 and the resistance substrate 54, thereby connector terminal 28 and the resistance substrate 54 are electrically connected. In the present embodiment, the clip 38 has cross sectional shape of roughly V shape.

At the surface of the brush 80 side of the resistance substrate 54, a conductive pattern and the resistor are formed, and constitute a variable resistor together with the brush 80 which slides against the conductive pattern and the resistor.

The brush 80 is attached to the sliding element receiver 60. The sliding element receiver 60 has the bearing end 65 which contact with the first end portion 71 of the shaft member 70. The bearing end 65 is placed so that it opposes the case main body bottom portion 86, and the sliding element receiver 60 moves relatively against the resistance substrate 54 together with the shaft member 70 which is in contact therewith at the bearing end 65.

Also, at the face opposing the case main body opening 84 at the sliding element receiver 60, the spring supporting projection 68 is formed. At the spring supporting projection 68, one side of the end portion of the returning spring 52 is engaged, and the sliding element receiver 60 is biased towards the case main body bottom portion 86 by the returning spring 52. Note that, the other side of the end portion of the returning spring 52 is engaged to the top side projection 16 formed at the top portion 14.

The shaft member 70 is placed in movable manner in the axial direction at the guide hole 88 which is the through hole formed at the case main body bottom portion 86. The first end portion 71 which is one side of the end portion of the shaft member 70 is placed inside of the case 9, and is in contact with the bearing end 65 of the sliding element receiver 60. The second end portion 72 which is the other side of the end portion of the shaft member 70 is exposed to the outside of the case 9 from the guide hole 88. The second end portion 72 is in contact with the measuring object when using the sensor 7.

Figure 2:
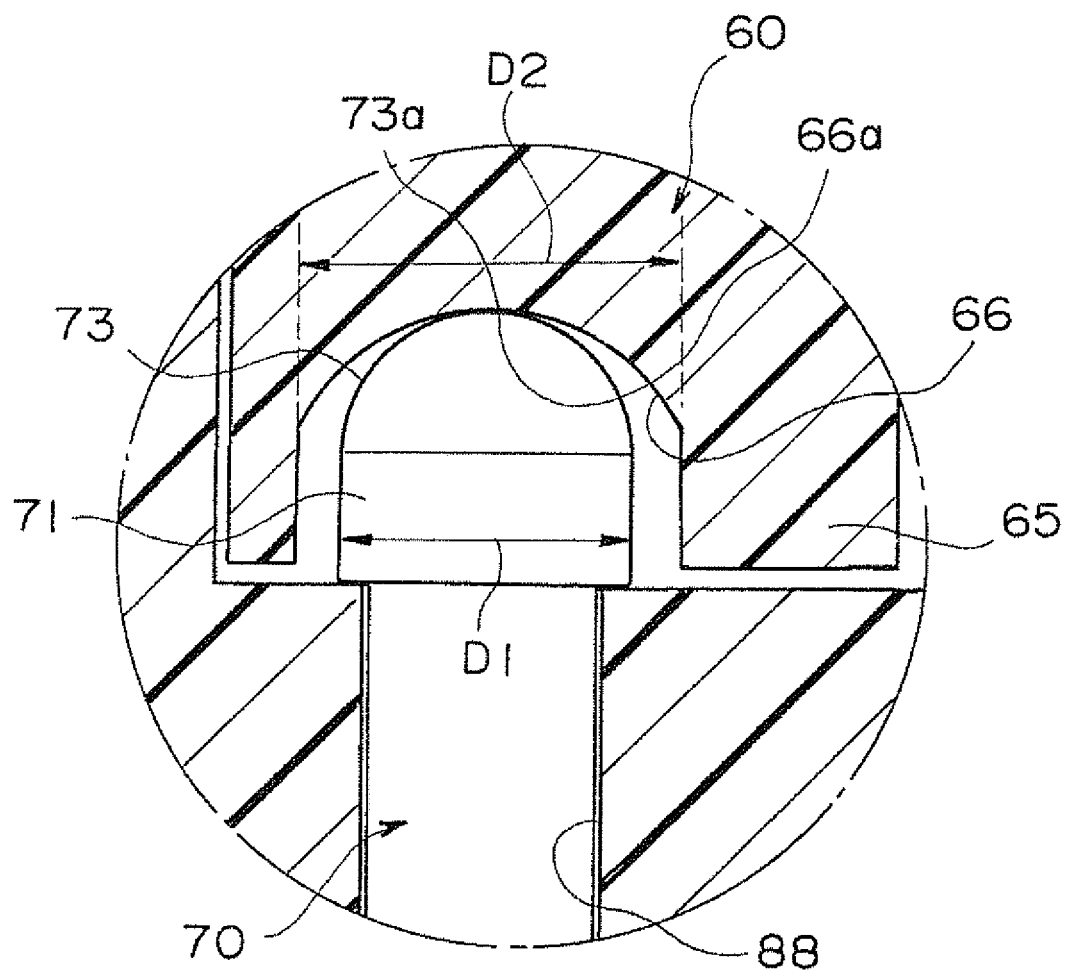
FIG. 2 is enlarged figure of the contact section of the shaft member and the sliding element receiver in the sensor shown in FIG. 1.

FIG. 2 is an enlarged view of the contact section of the shaft member 70 and the sliding element receiver 60 in the sensor shown in FIG. 1. As shown in FIG. 2, at the first end portion 71 of the shaft member 70, the hemispherical end face 73 is formed. Also, at the bearing end 65 of the sliding element receiver 60, the hemispherical hole 66 which internally contacts at the hemispherical end face 73. The curvature of the hemispherical hole 66 is smaller than that of the hemispherical end face 73.

Here, "hemispherical" at the hemispherical end face 73 and the hemispherical hole 66 typically refers to the surface shape which is round and appears like a shape such that a part of the surface of the sphere has been cut out. That is, the "hemispherical" in the present specification and the present claim is not strictly limited to the meaning of half of the sphere, and the "hemispherical" in the present specification and the present claim includes the surface shape of such that a part of the surface of the sphere or the oval object has been cut or the surface shape having a round shape similar thereto.

As shown in FIG. 2, the opening diameter D2 of the hemispherical hole 66 is preferably larger than the diameter D1 of the first end portion 71. By making the opening diameter D2 of the hemispherical hole 66 larger than the diameter D1 of the first end portion 71, even in case the shaft member 70 is tilted, the side face of the first end portion 71 does not contact and trapped to the inner circumference face of the bearing end 65, and the shaft member 70 can further smoothly move inside of the guide hole 88.

Under the condition that no force is applied to the shaft member 70 from the second end portion 72, the first end portion 71 and the bearing end 65 are in contact by the condition that the tip 73a of the hemispherical end face 73 is in contact with the bottom portion 66a of the hemispherical hole 66. Therefore, the shaft member 70 becomes less likely to tilt against the guide hole 88. On the contrary to this, when using the sensor 7, particularly when the shaft member 70 is moving in the direction pressing into the inside of the case 9, the shaft member 70 easily tilt against the guide hole 88 (or the placed position in the design). In between the guide hole 88 and the circumference wall of the shaft member 70 opposing the guide hole 88, a slight space (gutter) is formed so that the shaft member 70 can move in the axial direction, and further when the shaft member 70 moves in the direction pressing into the inside of the case 9, the shaft member 70 is pressed against the spring force of the returning spring 52.

However, in the sensor 7 according to the present invention, the hemispherical end face 73 is formed at the first end portion 71 of the shaft member 70, and at the bearing end 65, the hemispherical hole 66 is formed to which the hemispherical end face 73 internally contacts. Therefore, the hemispherical hole 66 of the bearing end 65 receive not only the axial direction force but also the radial direction force perpendicular to the axial direction, from the hemispherical end face 73 of the first end portion 71.

Thereby, the sensor 7 can prevent the tip 73a from being shifted against the bottom portion 66a even when the force to tilt the shaft member 70 is applied, and the abrasion at the contact section between the shaft member 70 and the sliding element receiver 60 can be reduced. Therefore, the sensor 7 can effectively prevent the deterioration of the detection accuracy caused by the abrasion or the shifting at the contact section between the shaft member 70 and the sliding element receiver 60. Also, the sensor 7 does not receive the radial direction force perpendicular against the axial direction at the wall opposing the side face of the first end portion 71, but it receives at the hemispherical hole 66 which internally contact with the hemispherical end face 73, thus it does not intercept the movement along the axial direction of the shaft member 70.

Even when the force to tilt the shaft member 70 is applied, the sensor 7 can suppress the tilting of the shaft member 70 since the force trying to match the position of the tip 73a of the hemispherical end face 73 and the bottom portion 66a of the hemispherical hole 66 (the force trying to solve the miss match between the axial direction and the normal line direction of the hemispherical hole 66 at the contact point, or the force trying to solve the parallel movement to the radial direction of the shaft member 70) acts to the shaft member 70. Therefore, the sensor 7 can suppress the change of the contact point between the shaft member 70 and the sliding element receiver 60, and can prevent the deterioration of the detection accuracy accompanied with such change of contact point.

Also, even when the shaft member 70 is tilted, the sensor 7 can deal with the slight change of the contact point between the shaft member 70 and the sliding element receiver 60. Therefore, even when the force to tilt the shaft member 70 is applied, the sensor 7 can make the change of the contact point between the hemispherical end face 73 and the hemispherical hole 66 compared to the case that the force to tilt the shaft member 70 is not applied, and thus the variation of the detection output and the hysteresis can be made small.

Figure 3:
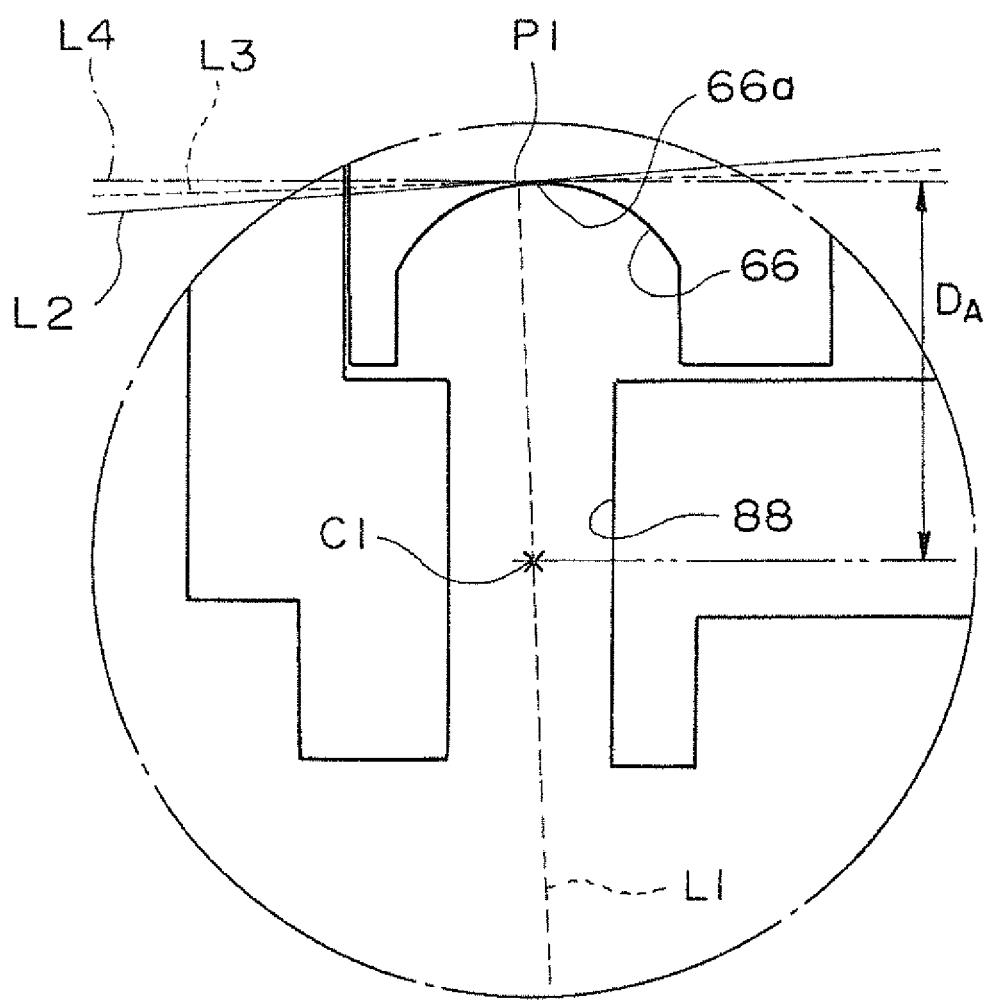
FIG. 3 is a schematic diagram showing the relation between the curvature of the hemispherical hole and the force acting on the shaft member when the shaft member is tilted in the sensor shown in FIG. 1.

Note that, the curvature R of the hemispherical hole 66 preferably satisfy $R > 1/D_A$, when $D_A$ is the distance between the bottom portion 66a of the hemispherical hole 66 under the condition that the shaft member 70 is most exposed to the outside (the condition shown in FIG. 1) and the center position C1 of the guide hole 88. As shown in FIG. 3, when the shaft member 70 is most tilted against the guide hole 88, the center line L1 of the shaft member 70 is thought to pass through the center position C1 of the axial direction of the guide hole 88. When the curvature R of the hemispherical hole 66 satisfy $R > 1/D_A$, the center line L1 of the shaft member 70 and the tangent line L2 of the hemispherical hole 66 at the intercept point P1 of the hemispherical hole 66 will have larger angle than perpendicular line L3 of the center line L1 at the intercept point P1 with respect to the standard line L4 perpendicular to the guide hole 88. In this case, the force trying to match the tangent line L2 and the perpendicular line L3 acts to the shaft member 70, thus such sensor 7 can effectively apply the force to suppress the tilt of the shaft member 70 thereto.

The invention claimed is:

1. A sensor comprising:
a case having a through hole;
a resistance substrate fixed within said case;
a shaft member having a first end portion which is one end of the shaft member placed within said case and a second end portion which is other end of the shaft member exposed to an outside of said case from said through hole, said shaft member being placed at said through hole in a movable manner in an axial direction; and
a sliding element receiver having a bearing end contacting with said first end portion of said shaft member, and attached with a brush sliding together with said resistance substrate, said sliding element receiver being capable of moving relatively against said resistance substrate with said shaft member;
wherein a hemispherical end face is formed at said first end portion,
a hemispherical hole internally contacting with said hemispherical end face is formed at said bearing end, and
$R > 1/D_A$ is satisfied when a curvature of said hemispherical hole is defined as R, and when a distance between a center position of said through hole and a bottom portion of said hemispherical hole under the condition that said shaft member is most exposed to the outside of said case is defined as $D_A$.

2. The sensor as set forth in claim 1, wherein;
an opening diameter of said hemispherical hole is larger than a diameter of said first end portion.

* * * * *